United States Patent
Heady

(10) Patent No.: US 7,144,029 B1
(45) Date of Patent: Dec. 5, 2006

(54) BICYCLE SEAT ATTACHMENT

(76) Inventor: Steven R. Heady, P.O. Box 2397, White City, OR (US) 97503

( * ) Notice: Subject to any disclaimer, the term of this patent is extended or adjusted under 35 U.S.C. 154(b) by 73 days.

(21) Appl. No.: 11/135,178

(22) Filed: May 23, 2005

Related U.S. Application Data

(63) Continuation-in-part of application No. 10/887,512, filed on Jul. 9, 2004, now abandoned.

(60) Provisional application No. 60/515,511, filed on Oct. 30, 2003.

(51) Int. Cl.
*B62J 1/02* (2006.01)
*B62J 1/10* (2006.01)
*B60N 2/28* (2006.01)

(52) U.S. Cl. .................. 280/288.4; 280/283; 280/220; 403/113; 403/116; 403/117; 248/622; 248/125.7; 267/132; 297/195.1; 297/213

(58) Field of Classification Search ............ 280/288.4, 280/283, 220; 403/113, 116, 117, 263
See application file for complete search history.

(56) References Cited

U.S. PATENT DOCUMENTS

| | | | |
|---|---|---|---|
| 5,383,705 A | * | 1/1995 | Voigt ........................ 297/211 |
| 5,489,139 A | * | 2/1996 | McFarland ............... 297/195.1 |
| 5,649,738 A | | 7/1997 | Thomson et al. |
| 5,833,255 A | * | 11/1998 | Sarder et al. ............... 280/220 |
| 6,270,065 B1 | * | 8/2001 | Hals .......................... 267/132 |
| 6,364,292 B1 | | 4/2002 | Chen et al. |
| 6,409,130 B1 | * | 6/2002 | Maret ...................... 248/219.2 |
| 6,443,524 B1 | | 9/2002 | Yu |
| 6,988,740 B1 | * | 1/2006 | Bobrovniczky ............. 280/276 |

* cited by examiner

*Primary Examiner*—Lesley D. Morris
*Assistant Examiner*—Marlon Arce-Diaz
(74) *Attorney, Agent, or Firm*—Gerald D Haynes; Ralph J. Skinkiss

(57) ABSTRACT

The present invention discloses unique apparatus for attaching a bicycle seat to a typical bicycle seat support post. The seat attaching apparatus permits the seat to controllably tilt, to the left and/or right of the bicycle longitudinal center line, as the bicyclist leans left or right as he/she pedals along. Thus, friction that normally occurs between the bicycle seat and the rider's inner thigh and crotch area significantly reduced or eliminated.

4 Claims, 4 Drawing Sheets

US 7,144,029 B1

BICYCLE SEAT ATTACHMENT

RELATED APPLICATIONS

This application is a Continuation In Part of Ser. No. 10/887,512 filed on Jul. 9, 2004 now abandoned, Titled "Butt Saver" which claims priority of Provisional Patent Application Ser. No. 60/515,511 filed on Oct. 30, 2003, Titled "Butt Saver."

FIELD OF THE INVENTION

The present invention generally relates to bicycles and more particularly relates to apparatus for attaching a bicycle seat, or saddle, to the bicycle's seat mounting post.

BACKGROUND OF THE INVENTION

Heretofore, bicycle seats have been rigidly attached to the bicycle mounting post by various adjustable clamping devices. Although such seat attachment devices may have provided some degree of adjustability, they only provided forward and rearward adjustment along with some degree of forward/rearward tilting whereby the forward portion of the seat may be tilted upward and/or downward to provide a seat orientation suitable to the cyclist.

With the bicycle seat attached to a bicycle seat post in a rigid manner, the rider's inner thighs and crotch areas rub against the sides and top of the bicycle seat while the rider is pedaling. This movement against the sides and top of the seat cause friction resulting in irritation of the inner thighs and crotch area of the average bicyclist.

PRIOR ART

U.S. Pat. No. 6,364,292 issued to Wen-Tsung Chen et al. on Apr. 2, 2002 titled "Shock Absorber For Saddle Of Bicycle" discloses an elastomeric shock absorber mounted between the bicycle seat and the bicycle seat support post. The elastomeric shock absorber permits the bicycle seat to tilt omni-directionally and has no stop means to limit the degree of tilt of the seat. Because of the seats omni-directional and unlimited degree of tilting, the seat becomes an unstable seat platform for the bicyclist.

U.S. Pat. No. 6,443,524 issued to Tsai-Yun Yu on Sep. 3, 2002 titled "Bicycle Saddle Having a Shock Absorbing Structure" discloses a bicycle seat attachment structure having a pair of laterally opposite shock absorbing elements at the rear of the seat. The Yu seat primarily provides absorbing of vertical road shocks and fails to provide for lateral tilting of the bicycle seat to relieve frictional irritation between the seat and the riders crotch and/or inner thigh area.

BRIEF DESCRIPTION OF THE INVENTION

By the present invention the problems of the prior art bicycle seat attachment mechanisms have been overcome. The seat attachment described herein provides a controlled degree of lateral tilting to help reduce and/or eliminate the frictional irritation that otherwise exists between the bicycle seat and the bicyclist crotch and/or inner thighs. A bicycle seat attachment apparatus is disclosed having a laterally pivoting seat attachment post. The pivoting seat attachment post is biased to the neutral, or center position, by a pair of opposing compression springs, positioned below the pivot axis, that act to resist and/or dampen the sideways movement of the seat mounting post. Threaded adjusting screw caps provide for adjustment of the compressive force applied to the lower portion of the seat attachment post and whereby the cyclist may control the degree of dampening.

BRIEF DESCRIPTION OF THE DRAWINGS

FIG. 4A presents a plan view of the main mounting block as taken along line 4A—4A—in FIG. 4.

DETAILED DESCRIPTION THE INVENTION

Figures 1, 2:
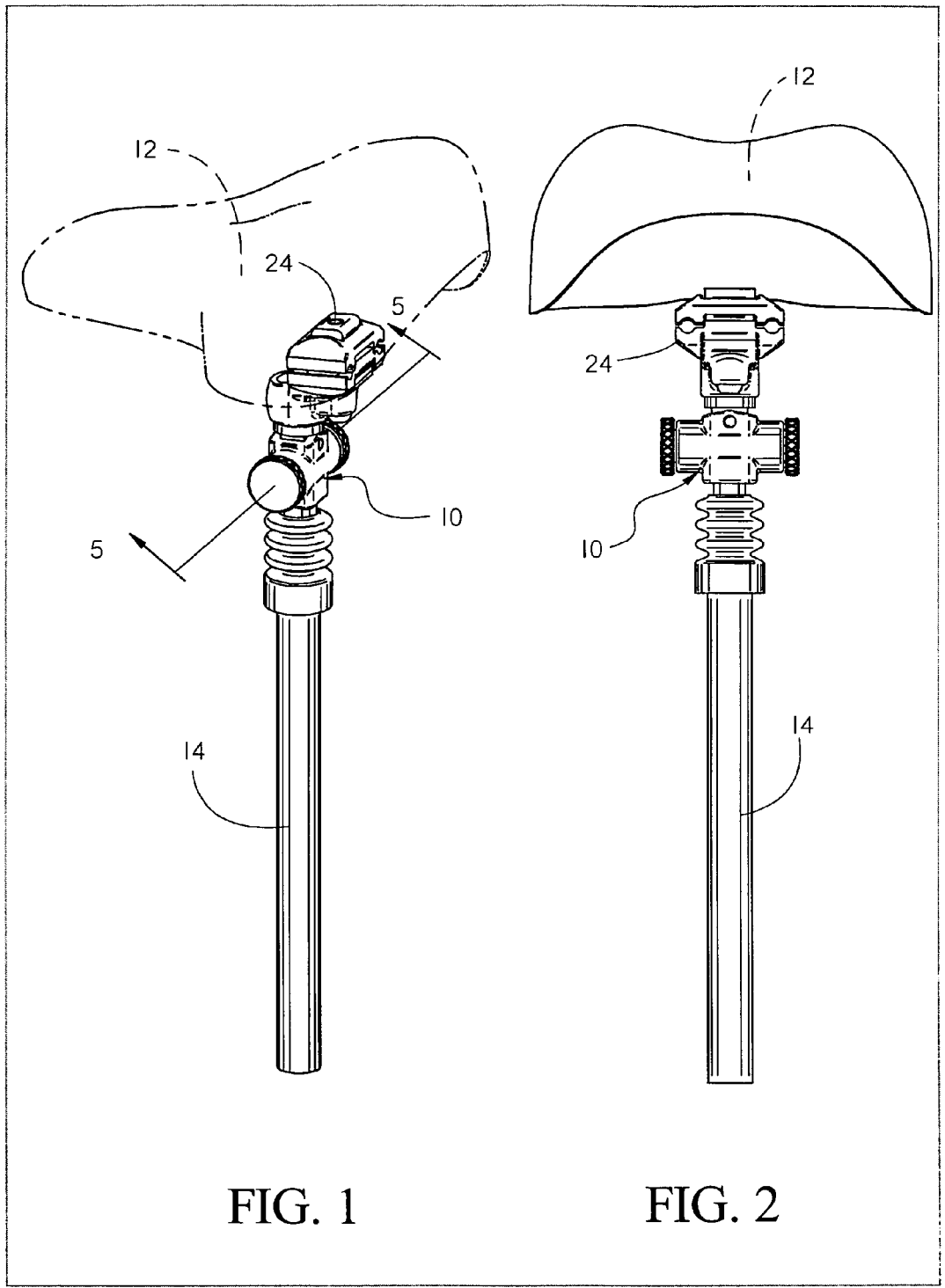
FIG. 1 presents a pictorial view of the present invention attached to a typical bicycle seat mounting post.
FIG. 2 presents a rear elevational view of the present invention attached to a typical bicycle seat post.

Structure:

FIGS. 1 and 2 illustrate my new improved apparatus 10 for mounting a bicycle seat 12, shown in phantom, upon a typical bicycle seat mounting post 14.

Figure 3:
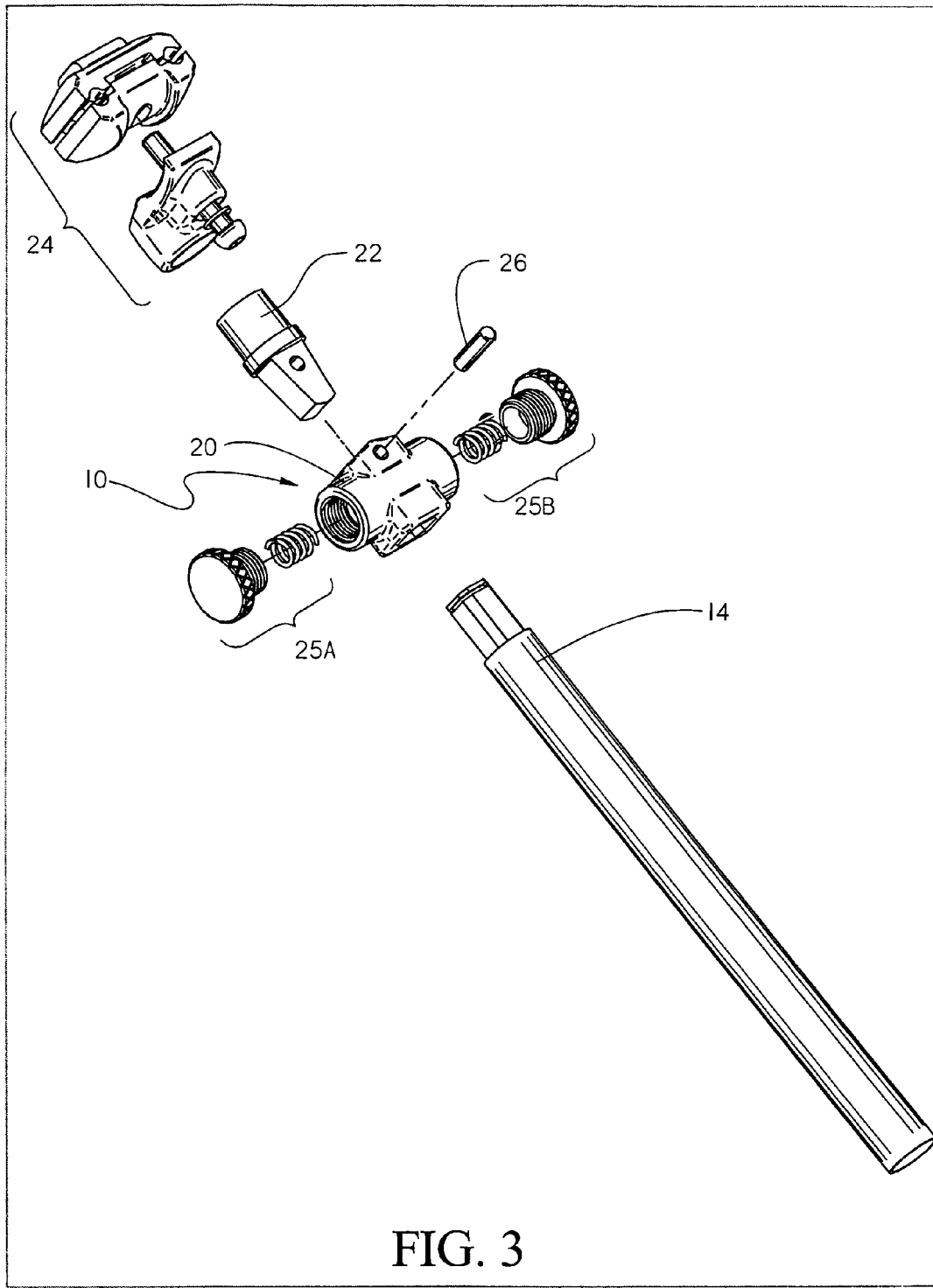
FIG. 3 presents an exploded pictorial showing the principle elements of the present invention.
Figure 4:
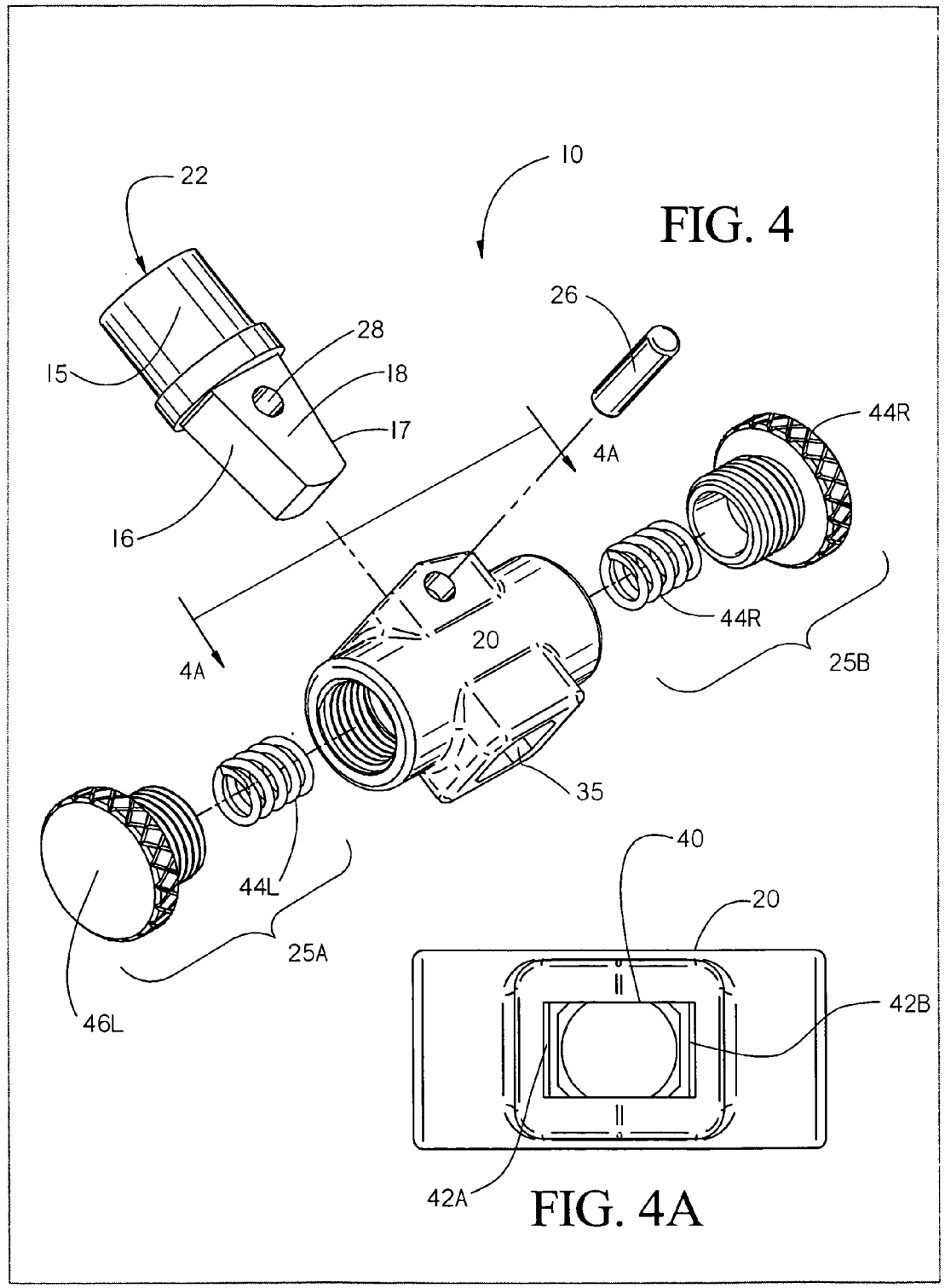
FIG. 4 presents an exploded pictorial view of the present invention.
Figure 5:
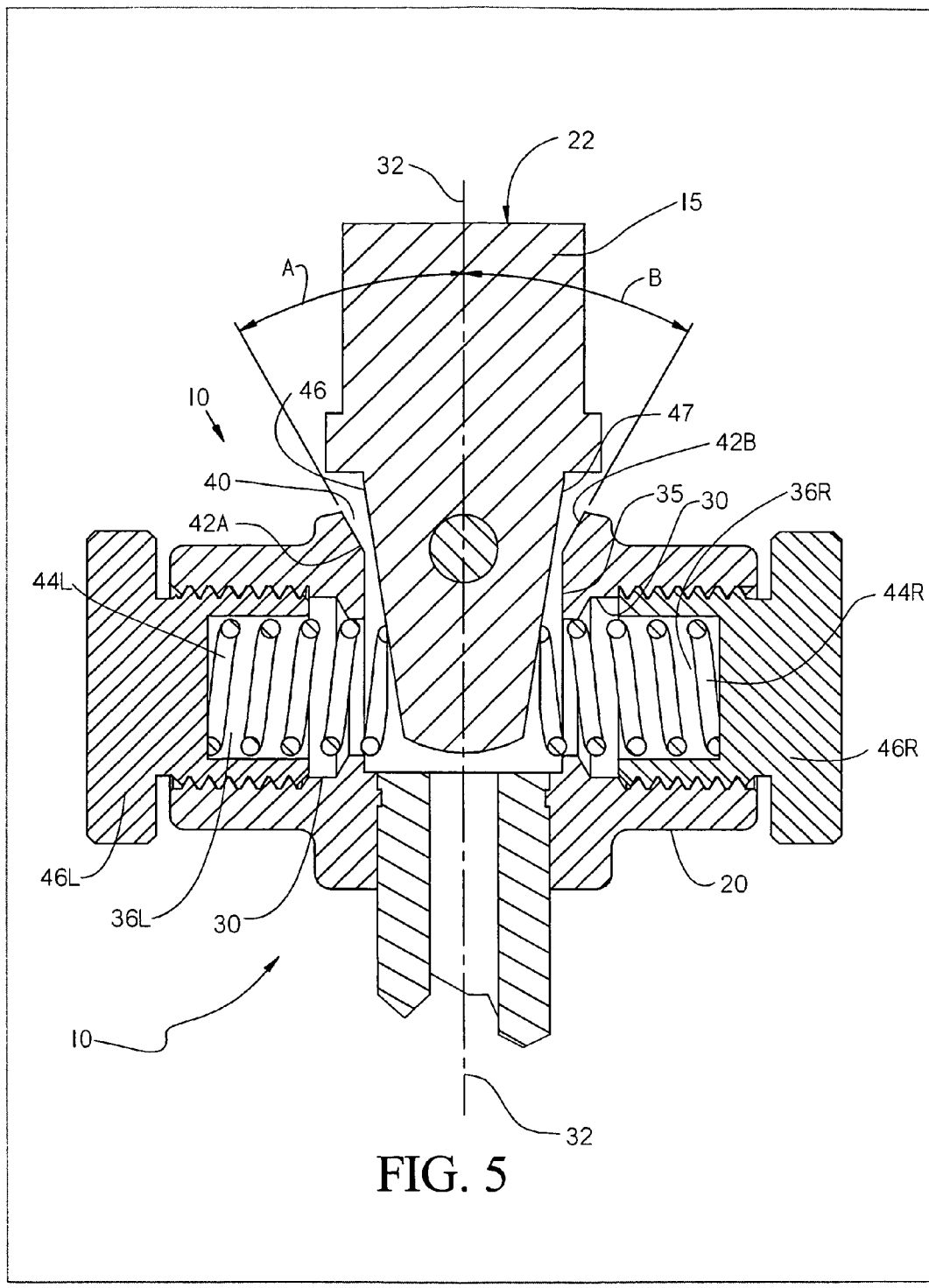
FIG. 5 presents a crossectional view taken along line 5—5 in FIG. 1.

Turning now to FIGS. 3 through 5, my bicycle seat mounting apparatus 10 comprises a main mounting block 20, having a bicycle seat pivoting post 22 upon which the bicycle seat clamping assembly 24 is attached.

Mounting block 20 includes a lateral bore 30 and a vertically intersecting bore 35. At the top of vertical bore 35 is an open, laterally extending slot 40 as best illustrated in FIG. 4A. As illustrated in FIG. 5, slot 40 is provided with tapered walls 42A and 42B each slanted at angle A and B respectively, with respect to center line 32.

Positioned within slot 35 is seat pivot post 22 as best illustrated in FIG. 5. Pivot post 22 comprises a top portion 15 and a lower portion 18 (See FIG. 4). The bicycle seat clamping mechanism 24 is attached to the top portion 15 of pivot post 22. The lower portion 18 of pivot post 22 is basically rectangular in crossection and includes two opposing, slanted sides 16 and 17.

Pivot post 22 is pivotally secured to main mounting block 20 by pivot pin 26 which extends through pilot hole 27 in main mounting block 20 and pilot hole 28 in pivot post 22. Pilot hole 28 extending through pivot post 22 is slightly larger that the diameter of pin 26 thereby permitting pivot block to freely tilt laterally within slot 40, and about pin 26. Pilot holes 27, within main mounting block 20 are slightly smaller in diameter than the diameter of pin 26 thereby providing an interfering fit between pin 26 and pilot holes 27. However, pivot pin 26 may be inserted and retained within mounting block 20 in any convenient manner.

When assembled within mounting block 20, the lower portion 18 of pivot post 22 extends downward into bore 30 thereby dividing bore 30 into two chambers 36L and 36R as best seen in FIG. 5. Inserted into each chamber 36L and 36R is a compression and the spring 44L and 44R respectively. Two threaded, adjusting end caps 46L and 46R close off chambers 36L and 36R compressing springs 44L and 44R between the end caps 46 and the lower portion 18 of pivot post 22 as illustrated in FIG. 5.

In Operation:

As illustrated in FIGS. 1 and 2, my bicycle seat mounting apparatus 10 is attached to a typical bicycle seat mounting post 14, by any suitable manner (not shown) such that the axis of lateral bore 30 is at a right angle to the longitudinal axis of the bicycle. Bicycle seat clamping assembly 24 is affixed to the top portion 15 of pivot post 22. Thus pivot post 22, pivoting about pivot pin 26, is free to pivot, or tilt, in the lateral direction (angels A and B) between zero to nine degrees either side of centerline 32 (preferably five degrees) as the bicycle rider pedals the bicycle. As pivot post 22 pivots about pivot pin 26, compression springs 44L and/or 44R offer resistance to the rotation of pivot post 22 by action of the lower portion 18 of pivot post 22 as it compresses compression spring 44L or 44R. By turning the adjusting screw end caps 46L and 46R, the rider may adjust the compressive forces acting upon the lower portion 18 of pivot post 22 to suit personal preferences.

While I have described above, the structure and operation of my invention in connection with a particular embodiment, it is to be clearly understood that this description is made only by way of example and not as a limitation of the scope of my invention as set forth in the accompanying claims.

I claim:

1. Apparatus for attaching a bicycle seat to a bicycle seat post comprising:
   a) a main body having a top surface and an opposing bottom surface, said main body including:
      1) a laterally extending bore therethrough,
      2) a vertically extending bore extending from said bottom surface and terminating at the intersection of said laterally extending bore, and
      3) in said top surface a laterally extending slot opposite said vertically extending bore,
   e) a vertically extending post pivotally positioned upon a pivot pin longitudinally extending across said slot whereby a lower portion of said post, below said pivot, extends into said laterally extending bore thereby dividing said laterally extending bore into a left and right chamber, whereby said post may oscillate within said slot in the lateral direction,
   f) a laterally extending compression spring within each of said left and right chambers,
   g) an end cap threaded into the open end of said left and right chamber whereby the compressive force applied to the lower portion of said vertically extending post may be adjusted by threadingly advancing said end cap inward or outward within said left and right chamber.

2. The apparatus as claimed in claim 1 wherein said laterally extending slot includes laterally opposing and downwardly converging sloped surfaces whereby the degree of lateral movement of said post is limited.

3. The apparatus as claimed in claim 2 wherein said sloped surfaces are sloped at an angle between five and fifteen degrees with respect to the centerline of said vertical bore.

4. The apparatus as claimed in claim 3 wherein said sloped surfaces are sloped at an angle of nine degrees with respect to the centerline of said vertical bore.

* * * * *